United States Patent
Shin

(10) Patent No.: US 7,383,827 B2
(45) Date of Patent: Jun. 10, 2008

(54) FUEL PUMP NOISE REDUCING APPARATUS AND METHOD THEREOF FOR LIQUEFIED PETROLEUM INJECTION VEHICLE

(75) Inventor: Chang Hyun Shin, Suwon-si (KR)

(73) Assignee: Hyundai Motor Company, Seoul (KR)

( * ) Notice: Subject to any disclaimer, the term of this patent is extended or adjusted under 35 U.S.C. 154(b) by 549 days.

(21) Appl. No.: 11/022,260

(22) Filed: Dec. 23, 2004

(65) Prior Publication Data

US 2005/0193992 A1 Sep. 8, 2005

(30) Foreign Application Priority Data

Mar. 4, 2004 (KR) ............... 10-2004-0014615

(51) Int. Cl.
*F02B 43/00* (2006.01)

(52) U.S. Cl. ............... 123/529; 123/198 DB; 123/198 D

(58) Field of Classification Search ............... 123/529, 123/527, 27 GE, 198 D, 525, 198 DB
See application file for complete search history.

(56) References Cited

U.S. PATENT DOCUMENTS

| 4,989,573 | A | * | 2/1991 | Yokoyama et al. | ......... 123/527 |
| 5,048,479 | A | * | 9/1991 | Bartke | ............... 123/198 D |
| 6,766,269 | B2 | * | 7/2004 | Lee | ............... 702/136 |
| 7,127,941 | B2 | * | 10/2006 | Shin | ............... 73/119 R |

* cited by examiner

*Primary Examiner*—Stephen K. Cronin
*Assistant Examiner*—Hyder Ali
(74) *Attorney, Agent, or Firm*—Morgan Lewis & Bockius LLP

(57) ABSTRACT

A fuel pump noise reducing apparatus and a methods for a Liquefied Petroleum Injection (LPI) vehicle stops fuel provision by shutting off valves if a Liquefied Petroleum Gas (LPG) switch is turned off. Also, operation of a fuel pump is stopped by allowing an Interface Box (IFB) Electronic Control Unit (ECU) to turn off a relay and by insulating battery power provided to the fuel pump, thereby resulting in a reduction of noise and engine output consumption generated from unnecessary operation of the fuel pump.

5 Claims, 2 Drawing Sheets

FUEL PUMP NOISE REDUCING APPARATUS AND METHOD THEREOF FOR LIQUEFIED PETROLEUM INJECTION VEHICLE

CROSS-REFERENCE TO RELATED APPLICATION(S)

The present application is based on, and claims priority from, Korean Application Serial Number 10-2004-0014615, filed on Mar. 04, 2004, the disclosure of which is hereby incorporated by reference herein in its entirety.

TECHNICAL FIELD OF THE INVENTION

Generally, the present invention relates to a fuel pump noise reducing apparatus and methods thereof for a Liquefied Petroleum Injection (LPI) vehicle. More particularly, the apparatus and methods control the operation of a fuel shut off valve and fuel pump according to activation of a Liquefied Petroleum Gas (LPG) switch.

BACKGROUND OF THE INVENTION

Typically, vehicles that use LPG for fuel are configured in a way so that the LPG is injected to the engine in a gas state. LPG is provided from the fuel tank and is turned into gas by being passed through a vaporizer and mixer. However, the LPG engine has drawbacks in that the engine output performance, fuel economy, vehicle start at a low temperature, exhaust gas, and the like are compromised. Therefore, LPI engine vehicles have been under development recently to facilitate increased use.

LPI engine vehicles are configured to compressively transmit LPG fuel to an injector through the fuel line by using a fuel pump installed in the fuel tank. Next, the injector injects fuel into the engine in a liquid state to improve engine output, fuel economy, vehicle start function at a low temperature, and to decrease exhaust gas. In LPI engine vehicles, a shut off valve is equipped in the fuel tank and regulator, respectively. If the LPG switch is turned off while the engine is running, an Interface Box (IFB) closes the shut off valves and stops the fuel flow through the injector.

In the conventional LPI engine vehicles, when the LPG switch is turned off, the isolating valves in the fuel tank and regulator are closed to stop the fuel supply. However, there is a drawback in that even when the engine stops, the fuel pump is continuously activated by another power source, thereby increasing noise and output consumption due to the unnecessary operation of the fuel pump.

SUMMARY OF THE INVENTION

An embodiment of the present invention provides a fuel pump noise reducing apparatus and methods for an LPI vehicle adapted to close the shut off valves of the regulator and fuel tank and to stop the fuel pump when the LPG switch is turned off. Thereby decreasing noise and output consumption due to unnecessary operation of the fuel pump.

A fuel pump noise reducing apparatus in a Liquefied Petroleum Injection (LPI) vehicle includes a Liquefied Petroleum Gas (LPG) switch. An Interface Box (IFB) Electronic Control Unit (ECU) controls the fuel of the LPI vehicle. A fuel pump in a fuel tank is configured to be activated by receiving battery power through a relay. The IFB ECU, having a terminal connected to a rear side of the LPG switch, is configured to determine that the LPG switch is turned off if the voltage detected through the terminal is less than the predetermined voltage. Thereby stopping operation of the fuel pump by turning off the relay and by insulating the battery power provided to the fuel pump.

A fuel pump noise reducing apparatus in a Liquefied Petroleum Injection (LPI) vehicle includes a Liquefied Petroleum Gas (LPG) switch. A plurality of shut off valves configured to be closed if battery power, provided through the LPG switch, stops, thereby, isolating the fuel supply. A relay provides or isolates the battery power. A fuel pump in a fuel tank is configured to be activated by receiving the battery power through the relay. An Interface Box (IFB) Electronic Control Unit (ECU) is configured to detect the voltage provided to the plurality of shut off valves through the LPG switch, and if the LPG switch is determined to be in an OFF state, the IFB ECU insulates the battery power provided to the fuel pump, by turning off the relay and thereby stopping operation of the fuel pump.

The IFB ECU detects the voltage applied to the plurality of shut off valves through the LPG switch and then compares the detected voltage with the predetermined value. If the detected voltage is higher than the predetermined voltage, the IFB ECU determines that the LPG switch is in an ON state and if the detected voltage is lower than a standard voltage, the IFB ECU determines that the LPG switch is in an OFF state. The shut off valves are equipped in the regulator and the fuel tank.

A fuel pump noise reducing method in a Liquefied Petroleum Injection (LPI) vehicle includes the steps of detecting the voltage applied to an shut off valve through a Liquefied Petroleum Gas (LPG) switch. The method also compares the detected voltage with a predetermined standard voltage and stops the operation of a fuel pump by insulating the battery power provided to the fuel pump if the detected voltage is less than or equal to a standard voltage and the LPG switch is determined to be in an OFF state.

BRIEF DESCRIPTION OF THE DRAWINGS

For a better understanding of the nature and objects of the present invention, reference should be made to the following detailed description, read in conjunction with the accompanying drawing, in which.

DETAILED DESCRIPTION OF PREFERRED EMBODIMENTS

Figure 1:
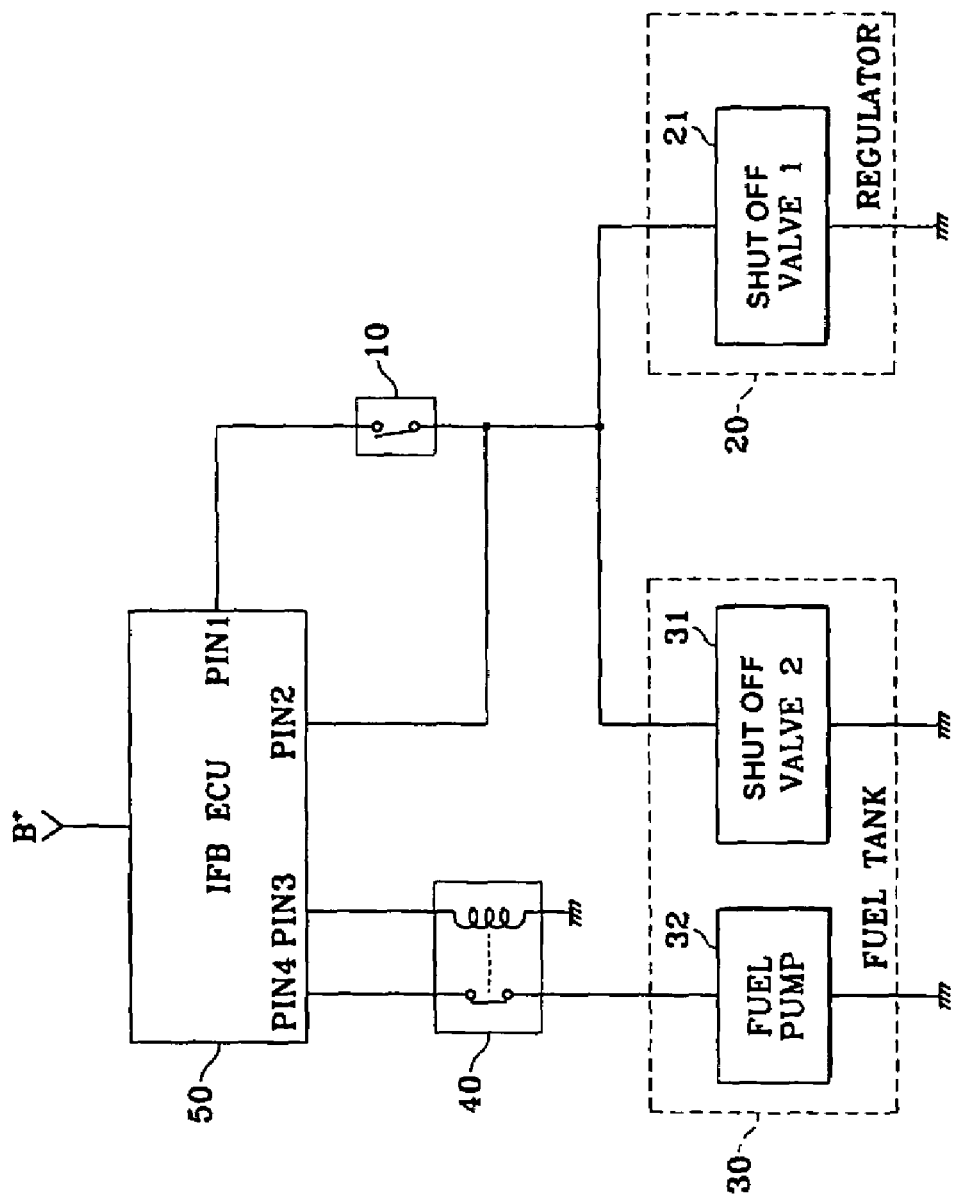
FIG. 1 is a circuit diagram of a fuel pump noise reducing apparatus in an LPI vehicle according to an embodiment of the present invention.

Referring to FIG. 1, a fuel pump noise reducing apparatus includes an LPG switch 10, shut off valve 21 in a regulator 20, shut off valve 31 in a fuel tank 30, fuel pump 32 in the fuel tank 30, relay 40, and Interface Box (IFB) Electronic Control Unit (ECU) 50 for controlling fuel. The LPI engine has an Engine Management System (EMS) ECU for controlling engine and has an IFB ECU for controlling fuel to activate the vehicle respectively.

The LPG switch 10 is turned on or off according to manipulation by the driver. In an emergency case or a potential fuel leakage situation, the driver turns off the LPG switch 10 to stop the fuel supply and prevent danger of fuel leakage or the like. When the battery power (B+, 12V power comes from the rear side of the main relay) provided through the LPG switch 10 is stopped by turning off the LPG switch 10, the shut off valve 21 of the regulator 20 and shut off valve 31 of the fuel tank 30 are closed, thereby stopping the fuel supply.

The IFB ECU 50 detects the voltage of the battery power (B+) via a terminal (PIN 2) connected to a rear side of the LPG switch 10. The B+ voltage is applied to the shut off valves 21 and 31 via the LPG switch 10. Then the IFB ECU 50 compares the above voltage with a pre-saved standard voltage. If the detected voltage is higher than the standard voltage, the IFB ECU 50 presumes that the LPG switch 10 is turned on. However, if the detected voltage is lower than or equal to the standard voltage, the IFB ECU 50 determines that the LPG switch 10 is in an OFF state. Provided that the LPG switch 10 is determined to be turned off, the IFB ECU 50 turns off the relay 40 and stops the battery power provided to the fuel pump 32 in order to stop the operation of the fuel pump 32.

The operation and effect of the fuel pump noise reducing apparatus and methods of the LPI vehicle according to the embodiment of the present invention will now be described in detail.

If the driver turns off the LPG switch 10 while the engine is running, the battery power provided to the shut off valve 21 of the regulator 20 and shut off valve 31 of the fuel tank 30 is insulated and the valves 21 and 31 are closed, thereby stopping the fuel supply through the injector. The IFB ECU 50 detects the voltage of the battery power (B+) via the terminal (PIN2) and compares the voltage with a predetermined voltage. The voltage of the battery power (B+) is applied to the shut off valves 21 and 31 through the LPG switch 10. If the detected voltage is lower than the standard voltage, the LPG switch 10 is determined to be in an OFF state.

Furthermore, if the IFB ECU 50 detects the PIN voltage without installation of a resistor or an amplifier around the PIN, 12V is detected while the LPG switch is turned on. However, 0V is detected while the LPG switch is turned off. On the other hand, if the resistor or amplifier is equipped around the PIN, the voltage value varies. Therefore, whether the LPG switch is turned on or off is determined by establishing a desirable predetermined voltage.

Figure 2:
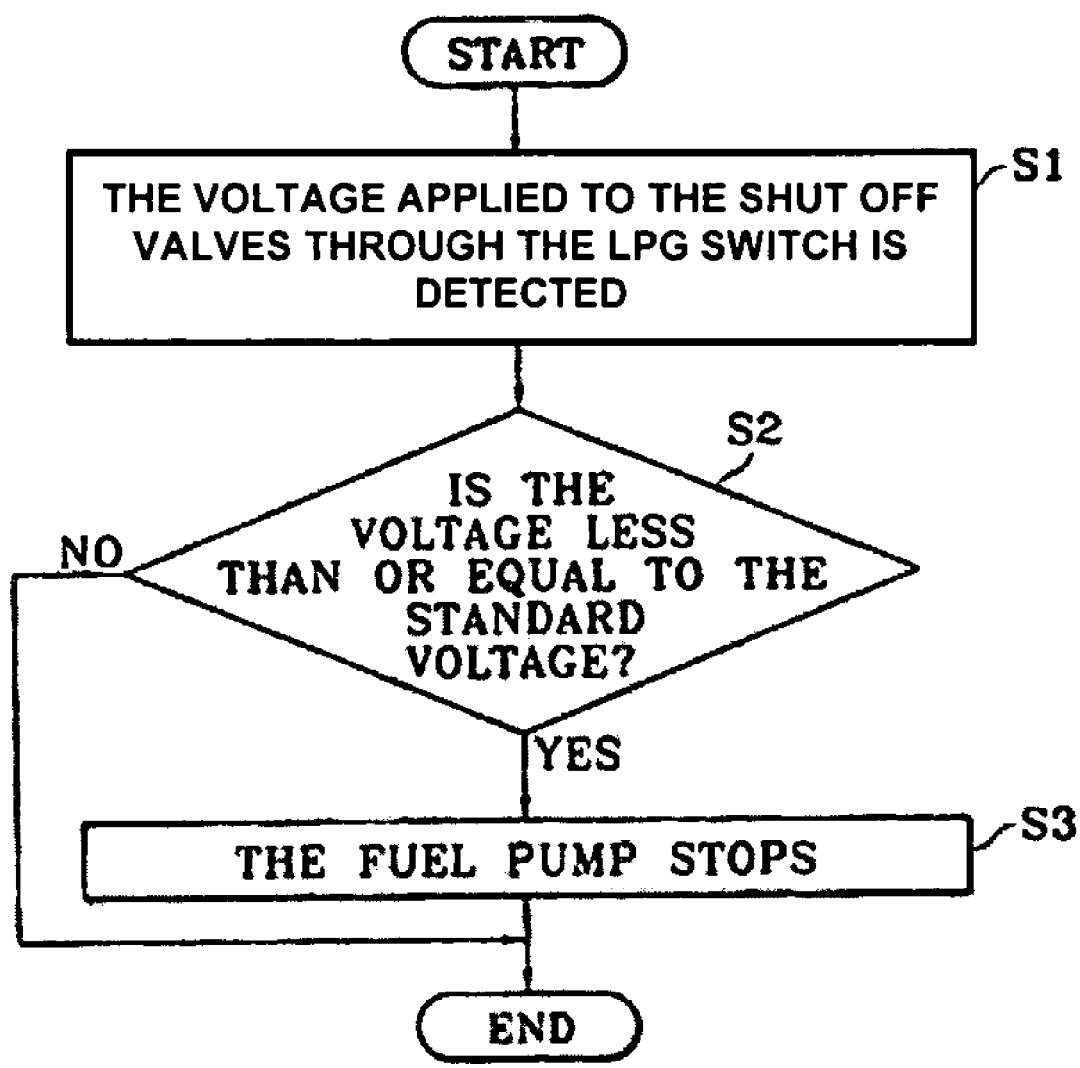
FIG. 2 is a flowchart of a fuel pump noise reducing method in an LPI vehicle according to an embodiment of the present invention.

Once the LPG switch 10 is determined to be turned off, the relay 40 is turned off to insulate the battery power provided to the fuel pump 32, thus stopping operation of the fuel pump 32. Accordingly, if the LPG switch 10 is turned off while the engine is running, the shut off valve 21 in the regulator 20 and shut off valve 31 in the fuel tank 30 are closed, and the fuel pump 32 stops operation. That is, with reference to FIG. 2, the IFB ECU 50 detects the voltage of the battery power (B+) via the terminal (PIN2) (step 1). The B+ voltage is applied to the shut off valves 21 and 31 through the LPG switch 10. The IFB ECU 50 compares the detected voltage with the predetermined standard voltage (step 2). If the detected voltage is less than or equal to the standard voltage, the IFB ECU 50 determines that the LPG switch 10 is turned off and thus step 3 is performed.

In step 3, the IFB ECU 50 turns off the relay 40 to insulate the battery power provided to the fuel pump 32 and deactivates the fuel pump 32. As apparent from the foregoing, there is an advantage in the present invention in that when the engine stops, the shut off valves in the fuel tank and the regulator are closed and, simultaneously, the fuel pump ceases operation. As a result, noise and engine output consumption caused by unnecessary operation of the fuel pump are effectively reduced.

What is claimed is:

1. A fuel pump noise reducing apparatus in a Liquefied Petroleum Injection (LPI) vehicle, the apparatus comprising:
    a Liquefied Petroleum Gas (LPG) switch;
    an Interface Box (IFB) Electronic Control Unit (ECU) controlling fuel of the LPI vehicle; and
    a fuel pump in a fuel tank configured to be activated by receiving battery power through a relay, wherein said IFB ECU having a terminal connected to a rear side of said LPG switch is configured to determine that said LPG switch is turned off if the voltage detected through said terminal is less than a predetermined voltage, thereby stopping operation of said fuel pump by turning off said relay and by insulating the battery power provided to said fuel pump.

2. A fuel pump noise reducing apparatus in a Liquefied Petroleum Injection (LPI) vehicle, the apparatus comprising:
    a Liquefied Petroleum Gas (LPG) switch;
    a plurality of shut off valves configured to be closed if battery power provided through said LPG switch stops, thereby insulating the fuel supply;
    a relay for providing or isolating the battery power;
    a fuel pump in a fuel tank configured to be activated by receiving the battery power through said relay; and
    an Interface Box (IFB) Electronic Control Unit (ECU) configured to detect voltage provided to said plurality of shut off valves through said LPG switch, and if said LPG switch is determined to be in an OFF state, said IFB ECU insulates the battery power provided to said fuel pump, by turning off said relay and thereby stopping operation of said fuel pump.

3. The apparatus as defined in claim 2, wherein said IFB ECU detects the voltage applied to said plurality of shut off valves through said LPG switch and then compares the detected voltage with a predetermined value, and if the detected voltage is higher than the predetermined voltage, said IFB ECU determines that said LPG switch is in an ON state, and if the detected voltage is lower than a standard voltage, said IFB ECU determines that said LPG switch is in an OFF state.

4. The apparatus as defined in claim 2, wherein said shut off valves are equipped in said regulator and said fuel tank.

5. A fuel pump noise reducing method in a Liquefied Petroleum Injection (LPI) vehicle, the method comprising the steps of:
    detecting a voltage applied to a shut off valve through a Liquefied Petroleum Gas (LPG) switch;
    comparing the detected voltage with a predetermined standard voltage; and
    stopping operation of a fuel pump by insulating battery power provided to said fuel pump if the detected voltage is less than or equal to a predetermined voltage and said LPG switch is determined to be in an OFF state.

* * * * *